(12) United States Patent
Schürmann

(10) Patent No.: US 11,731,211 B2
(45) Date of Patent: Aug. 22, 2023

(54) LASER MACHINING SYSTEM AND METHOD FOR MACHINING A WORKPIECE USING A LASER BEAM

(71) Applicant: Precitec GmbH & Co. KG, Gaggenau (DE)

(72) Inventor: Bert Schürmann, Gernsbach (DE)

(73) Assignee: PRECITEC GMBH & CO. KG, Gaggenau (DE)

( * ) Notice: Subject to any disclaimer, the term of this patent is extended or adjusted under 35 U.S.C. 154(b) by 334 days.

(21) Appl. No.: 16/540,501

(22) Filed: Aug. 14, 2019

(65) Prior Publication Data
US 2020/0055141 A1    Feb. 20, 2020

(30) Foreign Application Priority Data

Aug. 14, 2018  (DE) .................... 10 2018 119 703.9

(51) Int. Cl.
*B23K 26/03* (2006.01)
*B23K 26/04* (2014.01)
*B23K 26/21* (2014.01)
*G01B 9/02091* (2022.01)

(52) U.S. Cl.
CPC .......... *B23K 26/032* (2013.01); *B23K 26/048* (2013.01); *B23K 26/21* (2015.10); *G01B 9/02091* (2013.01)

(58) Field of Classification Search
CPC .... B23K 26/032; B23K 26/048; B23K 26/08; B23K 26/21; B23K 26/36; G01B 9/02091; G01B 11/14; G01B 11/22
See application file for complete search history.

(56) References Cited

U.S. PATENT DOCUMENTS

| | | | | |
|---|---|---|---|---|
| 2010/0155375 A1* | 6/2010 | Dietz | .................. | B23K 26/046 219/121.18 |
| 2015/0338210 A1* | 11/2015 | Lessmuller | .......... | B23K 26/032 250/492.1 |
| 2016/0039045 A1* | 2/2016 | Webster | ................ | B23K 10/02 356/496 |
| 2016/0059350 A1* | 3/2016 | Schoenleber | .......... | G01B 11/14 219/121.81 |
| 2019/0091798 A1* | 3/2019 | Schönleber | ........ | B23K 26/0648 |

FOREIGN PATENT DOCUMENTS

| | | |
|---|---|---|
| DE | 102013015656 B4 | 2/2016 |
| DE | 102014011569 B4 | 8/2016 |
| WO | 2018136622 A1 | 7/2018 |

* cited by examiner

*Primary Examiner* — Justin C Dodson
(74) *Attorney, Agent, or Firm* — Dinsmore & Shohl LLP

(57) ABSTRACT

A machining head is provided for a laser machining system configured to machine a workpiece using a laser beam. The machining head includes a housing having an opening for emitting the laser beam from the machining head; at least one reflective reference at the housing; and a measuring device configured to direct an optical measurement beam towards the opening and the at least one reflective reference. The measuring device is further configured to determine a distance (d1) between the end portion and the workpiece on the basis of a first reflection (A) of the optical measurement beam from the at least one reflective reference and a second reflection (B) of the optical measurement beam from the workpiece.

11 Claims, 3 Drawing Sheets

LASER MACHINING SYSTEM AND METHOD FOR MACHINING A WORKPIECE USING A LASER BEAM

CROSS-REFERENCE TO RELATED APPLICATION

This application claims priority from German Application No. 10 2018 119 703.9 filed Aug. 14, 2018, the entire content of which is incorporated herein by reference.

FIELD OF THE INVENTION

The present disclosure relates to a laser machining system configured to machine a workpiece using a laser beam and a method for machining a workpiece using a laser beam. In particular, the present disclosure relates to a laser machining head, e.g., for laser welding or laser cutting, with an optical coherence tomograph for measurement of the distance to the workpiece.

BACKGROUND OF THE INVENTION

In a device for machining material using a laser, e.g., in a laser machining head for laser welding or laser cutting, the laser beam emitted from a laser light source or an end of a laser fiber is focused or collimated on the workpiece to be machined by means of a beam guiding and focusing optics.

For laser machining of material, in particular for laser cutting or laser welding, the distance between the machining head and the workpiece surface or the distance between a nozzle arranged at the end of the machining head and the workpiece surface must be kept constant. The more constant the distance can be kept during machining, the more stable the machining process runs. Usually, a capacitive measuring method is used for distance measurement, wherein the workpiece surface and the surface of the cutting nozzle form a capacitor which is part of a resonant circuit. However, since the workpiece, as well as the other parts of the cutting machine, such as a three-jaw chuck of a profile cutting machine, is at ground potential, field lines do not only form between the cutting nozzle and the workpiece, but also between the cutting nozzle and the three-jaw chuck arranged next to the cutting nozzle. The closer the nozzle gets to the three-jaw chuck, the greater the influence on the measured distance signal becomes. A similar situation arises when cutting parts from a metal sheet: often the parts cut out by the laser beam do not fall out of the metal sheet, but get jammed and may therefore protrude from the metal sheet. Hence, also in flatbed cutting, where there is no three-jaw chuck, the capacitive distance measurement may be affected. Otherwise, the cut-out parts may fall out of the metal sheet. If a cut runs very close to a cut-out contour, the capacitive distance measurement may be affected because the capacitor surface contains holes.

In capacitive measurement methods, therefore, there is a large lateral sensitivity in the measurement of the distance to a workpiece surface under the cutting nozzle. Thus, the measurement of the distance to the workpiece using a capacitive measuring method may be inaccurate.

DE 10 2014 011 569 B4 discloses a method for measuring the distance between a workpiece and a machining head of a laser machining device by means of optical coherence tomography.

SUMMARY OF THE INVENTION

It is an object of the present disclosure to provide a machining head for a laser machining system configured to machine a workpiece using a laser beam and a method for machining a workpiece using a laser beam, which allow for a precise and error-free measurement of the distance to a workpiece.

This object is achieved by the subject matter disclosed herein. Advantageous embodiments of the invention are also disclosed.

According to an aspect of the present disclosure, a laser machining system for machining a workpiece using a laser beam, preferably for cutting a workpiece using a laser beam, is disclosed. The laser machining system comprises a machining head with a housing having an opening for emitting the laser beam from the machining head and at least one reflective reference for reflecting a measurement beam. In other words, the opening may be formed such that, during operation of the laser machining system, the laser beam exits the opening and hits the workpiece. The at least one reflective reference may be arranged in the housing. The laser machining system further comprises a measuring device configured to direct the measurement beam to the opening and the at least one reflective reference, wherein the measuring device is further configured to determine a distance between the machining head (or between an end portion of the machining head) and the workpiece based on (i) a first reflection of the optical measurement beam from the at least one reflective reference and (ii) at least one second reflection of the optical measurement beam from the workpiece. The end portion may be the part of the machining head which includes the opening and/or is (directly) opposite the workpiece during machining. The reflective reference may be located at the end portion or adjacent thereto. The optical measurement beam and the laser beam may run substantially in parallel to one another, in particular coaxially, in the machining head, at least in the region of the opening. In other words, the beam axes of the optical measurement beam and of the laser beam preferably extend substantially in parallel or coaxially through the opening. Thus, the optical measurement beam and the laser beam may hit the workpiece surface coaxially and/or perpendicularly. The optical measurement beam may hit the reflective reference at an angle. Therefore, the reflected beam or the first reflection may also be not parallel or not coaxial with the optical measurement beam and/or with the laser beam.

Preferably, the measuring device is further configured to determine a distance between a surface of the workpiece and a machining ground and/or a distance between the machining head and the machining ground based on a third reflection from the machining ground or machining point of the laser beam. The machining may be a welding process, a cutting process, a piercing process or an ablation process in which material is removed in order to form a blind hole, for example. Accordingly, the machining point may be a welding point, cutting point, piercing point or ablation point. In other words, not only the distance between the end portion, e.g., the nozzle, and the workpiece surface can be determined. For example, by determining the distance between the surface of the workpiece and the machining ground, a machining depth, i.e., a cutting depth, piercing depth, ablation depth or welding depth, may be determined. Thus, at the distance to the workpiece and a machining depth or a distance to the machining ground may be determined concurrently. For this purpose, preferably a continuous measurement beam with a circular cross-section and a diameter greater than a diameter of the opening is used, so that both a first and a second reflection and a third reflection are generated.

According to another aspect of the present disclosure, a method for machining a workpiece using a laser beam is provided. The method comprises providing a machining head with a housing having an opening for emitting the laser beam from the machining head; directing the laser beam to the opening; directing an optical measurement beam to the opening and at least one reflective reference at the housing; and determining a distance between the machining head or an end portion of the machining head and the workpiece based on (i) a first reflection of the optical measurement beam from the at least one reflective reference and (ii) at least one second reflection of the optical measurement beam from the workpiece. The optical measurement beam and the laser beam may run substantially parallel to each other in the machining head, at least in the region of the opening. Additionally, when determining the distance, an offset between the at least one reflective reference and the end portion may be taken into account. The method may be implemented by the machining head of the present disclosure. In addition, the machining head may be configured to perform the method according to the present disclosure.

According to the invention, the distance between the end portion of the machining head, such as a cutting nozzle, and the workpiece is determined using at least two optical measurement signals, and optionally using an offset between the at least one reflective reference and an end portion of the machining head. This allows for a precise and error-free measurement of the distance to the workpiece. In addition, when cutting with laser radiation, the distance between the machining head, in particular the nozzle or cutting nozzle, to the surface of the workpiece can be kept constant. Due to the constant distance during cutting, the machining process is more stable.

Due to a parallel or coaxial course of the optical measurement beam and the laser beam, an accuracy of the distance determination can also be increased, especially at long distances. At large distances, a measurement beam emitted obliquely through the opening may fall into an adjacent cut-out contour in the metal sheet and thus provide no information about the distance between the machining head and the workpiece surface. Likewise, a measurement beam emitted obliquely through the opening may fall on a jammed cut-out part and thus provide incorrect information about the distance.

The method and the laser machining system according to these aspects may have the following preferred features alone or in combination:

In some embodiments, the optical measurement beam and the laser beam are coaxial with each other in the machining head, at least in the region of the opening. The optical measurement beam or the beam axis thereof may be coaxial or parallel to an optical axis of the laser machining head in the region of the opening. The optical measurement beam and the laser beam may have different wavelengths. In this way, reflected portions of the laser beam may be distinguished or separated from reflections of the optical measurement beam.

Preferably, the measuring device is configured to calculate the distance between the end portion and the workpiece based on a difference between a distance from the at least one second reflection and a distance from the first reflection, taking into account the offset. The end portion may be an extreme end of the machining head opposite the workpiece. The distance between the end portion of the machining head and a surface of the workpiece may, in some embodiments, be defined such that the machining head, e.g., the cutting nozzle, contacts the surface of the workpiece when the distance between the end portion and the surface of the workpiece is approximately zero, and does not contact the surface of the workpiece (i.e., a gap is present) when the distance is greater than zero. This makes it possible to ensure that a gap exists between the cutting nozzle and the workpiece during a machining process. In addition, collision detection between nozzle and workpiece is possible.

Preferably, the at least one reflective reference comprises a reflective surface and/or a reflective edge and/or a reflective radius. In particular, the at least one reflective reference may be oriented in such a way that the optical measurement beam incident on the at least one reflective reference is reflected back into itself. The at least one reflective reference is preferably located in the immediate vicinity of the opening, and in particular in a circumferential area of the opening. The at least one reflective reference may encompass the opening at least partially, and preferably completely. The at least one reflective reference may provide a defined reflection of the optical measurement beam incident on the at least one reflective reference, thereby enabling a precise distance measurement.

Preferably, the at least one reflective reference is arranged on the inner surface of the housing or provided by the inner surface of the housing. For example, the inner surface of the housing may be configured to reflect the optical measurement beam. Thus, the at least one reflective reference may be provided easily and without the provision of an additional component in the machining head.

Preferably, the machining head further comprises a nozzle, in particular a cutting nozzle, which forms at least a portion of the housing and which comprises at least one reflective reference and/or the opening. For example, the at least one reflective reference is formed on the inner surface of the nozzle containing the opening. In particular, the at least one reflective reference may be arranged on a circumference or circumferential area of the opening and may encompass the opening at least partially, and preferably completely. By arranging the at least one reflective reference close to the end portion of the machining head, the accuracy of the distance measurement can be further improved. For example, an influence of an optical path length change in the machining head can be minimized.

Preferably, the measuring device comprises an optical coherence tomograph. The optical measurement beam may be generated by a light source of the coherence tomograph. The coherence tomograph may include a detector configured to detect a superposition of the first and the second reflection of the optical measurement beam and to determine the distance to the at least one reflective reference or to the workpiece therefrom. In addition, the coherence tomograph may have a reference arm, wherein the detector is configured to detect a superposition of the first and/or the second reflection of the optical measurement beam with a beam reflected in the reference arm. The distance may correspond to a path length of the reflection between the at least one reflective reference or the workpiece and a reference point of the reference arm.

Preferably, the optical measurement beam is a single optical measurement beam, so it may be a so-called continuous beam. The optical measurement beam preferably has a circular beam cross section. So even without complicated beam forming techniques or the like, the distance to the workpiece and optionally additionally the distance to the machining ground can be determined with a simple beam profile by means of optical coherence tomography (OCT).

A diameter of the optical measurement beam may be at least greater than a machining width, e.g., a welding width or kerf width. As a result, it can be ensured that at least a part of the optical measurement beam hits the workpiece surface outside the kerf or the machining point. For example, the single (continuous) optical measurement beam may be so large in diameter that it hits the at least one reflective reference and the workpiece surface (and optionally the machining point or the kerf). As a result, an extensive illumination of the reflective reference and the workpiece can be achieved, whereby the distance measurement can be performed easily and with high reliability.

The optical measurement beam may be a continuous beam having a diameter greater than a diameter of the opening of the housing. In this case, a simple optical design may achieve both a first reflection at the reflective reference, a second reflection at the workpiece surface, and a third reflection at the machining point, e.g., from the machining ground or puncture blind hole. In other words, this may be used to determine topography of the environment of the machining point. Alternatively, a beam axis of the optical measurement beam may be offset with respect to the beam axis of the laser beam so as to hit both the reflective reference and the opening. In particular, the beam axis of the optical measurement beam may in this case be arranged eccentrically with respect to the opening, but nevertheless extend in parallel to the beam axis of the laser beam.

Alternatively, the optical measurement beam may have two or more partial beams, wherein at least a first partial beam of the two or more partial beams may be directed to the at least one reflective reference and at least one second partial beam of the two or more partial beams may be directed to the opening. The partial beams of the optical measurement beam are preferably parallel to one another. The two or more partial beams may be spatially separated from each other and/or may be generated by separate light sources. For example, the two or more partial beams may be directed independently of each other to different regions on the workpiece. This allows to ensure, e.g., during laser cutting, that at least one measurement point is located outside the kerf, i.e., on the surface of the workpiece. In addition, with three or more measuring points, an inclination of the workpiece can be detected.

Distance may refer to the shortest connecting path between two elements.

BRIEF DESCRIPTION OF THE DRAWINGS

Embodiments of the disclosure are illustrated in the figures and will be described in more detail below. In the figures.

DETAILED DESCRIPTION OF THE INVENTION

Figure 1:
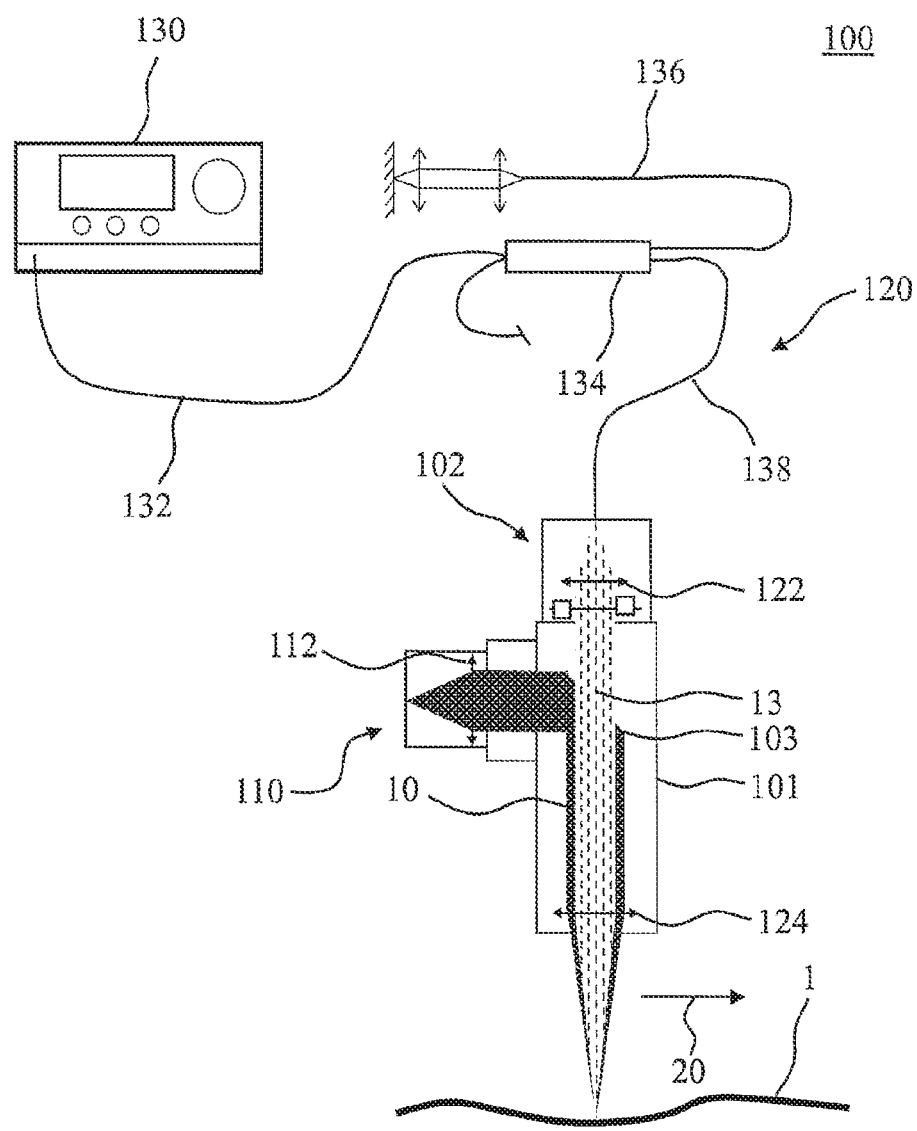
FIG. 1 shows a laser machining system with a machining head according to embodiments of the present disclosure.

In the following, unless otherwise noted, like reference numerals will be used for like and equivalent elements.

FIG. 1 shows a schematic diagram of a laser machining system 100 according to embodiments of the present disclosure. The laser machining system 100 comprises a machining head 101, e.g., a laser cutting head.

The laser machining system 100 includes a laser apparatus 110 for providing a laser beam 10 (also referred to as "machining beam" or "machining laser beam") and a measuring device for measuring a distance between a workpiece 1 and an end portion of the machining head 101 such as a nozzle. The end portion or nozzle has an opening through which the laser beam 10 is emitted from the machining head 101.

The laser machining system 100 or parts thereof, such as the machining head 101, may be movable along a machining direction 20 according to embodiments. The machining direction 20 may be a cutting or welding direction and/or a moving direction of the laser machining system 100, such as the machining head 101, with respect to the workpiece 1. In particular, the machining direction 20 may be a horizontal direction. The machining direction 20 may also be referred to as "feed direction".

The laser apparatus 110 may have collimator optics 112 for collimating the laser beam 10. Within the machining head 101, the laser beam 10 is deflected or reflected by approximately 90° towards the workpiece 1 by a suitable optics 103. The optics 103, for example a semitransparent mirror, may be configured, for example, to allow light reflected back from the workpiece 1 to pass through to the measuring device. The optical measurement beam and the laser beam may have different wavelengths, so that only measuring light reflected back reaches the measuring device.

The measuring device may comprise a coherence tomograph 120 or may be a coherence tomograph 120. The coherence tomograph 120 may comprise an evaluation unit 130 having a broadband light source (e.g., a super luminescence diode, SLD) which couples the measurement light into an optical waveguide 132. In a beam splitter 134, which preferably includes a fiber coupler, the measurement light is typically split into a reference arm 136 and a measurement arm, which leads into the machining head 101 via an optical waveguide 138. The coherence tomograph 120 may further comprise a collimator optics 122 configured to collimate an optical measurement beam 13. The collimator optics 122 may be integrated with the machining head 101. For example, the machining head 101 may comprise a collimator module 102 integrated with the machining head 101 or mounted on the machining head 101.

Furthermore, a focusing optics 124 configured to focus the laser beam 10 and/or the optical measurement beam 13 onto the workpiece 1 is provided in the machining head 101. The focusing optics 124 may be a common focusing optics, such as a focus lens, for the laser beam 10 and the measurement beam 13.

In some embodiments, the laser beam 10 and the optical measurement beam 13 may be parallel or even coaxial at least in sections, and may in particular be coaxially superposed at least in sections. For example, the coherence tomograph 120 may be configured to couple the optical measurement beam 13 into a beam path of the laser apparatus 110. The merging of the optical measurement beam 13 and the laser beam 10 may occur downstream of the collimator optics 122 and upstream of the focusing optics 124. Alternatively, the beam paths of the measurement beam 13 and of the laser beam 10 are largely guided separately and merged only downstream of the focusing optics 124 upstream of the opening of the laser machining head 101. The beam axes of the laser beam 10 and of the measurement beam 13 may be parallel or even coaxial near the opening 212 or the end portion 216, and are preferably perpendicular to the workpiece surface.

The principle of distance measurement described herein is based on the principle of optical coherence tomography, making use of the coherence properties of light using an interferometer. For distance measurement, the optical measurement beam 13 is directed onto a surface 2 of the workpiece 1. The measurement light reflected back from the surface (i.e., the reflections described with reference to FIGS. 2 and 3) is imaged onto the exit/entry surface of the optical waveguide 138 by the focusing optics 124, superposed with the light reflected back from the reference arm 136 in the fiber coupler 134, and then directed back to the evaluation unit 130. The superposed light contains information about the path length difference between the reference arm 136 and the measurement arm. This information is evaluated in the evaluation unit 130, whereby the user obtains information about the distance between the surface of the workpiece and the machining head 101. Preferably, however, according to embodiments of this disclosure, the reference arm 136 is not provided in the measuring device, but, instead of a light reflected back from the reference arm 136, a partial beam or portion of the measurement beam reflected back at a reflective reference in the machining head 101 is used as the reference for the partial beam or part of the measurement beam reflected back from the workpiece.

Figure 2:
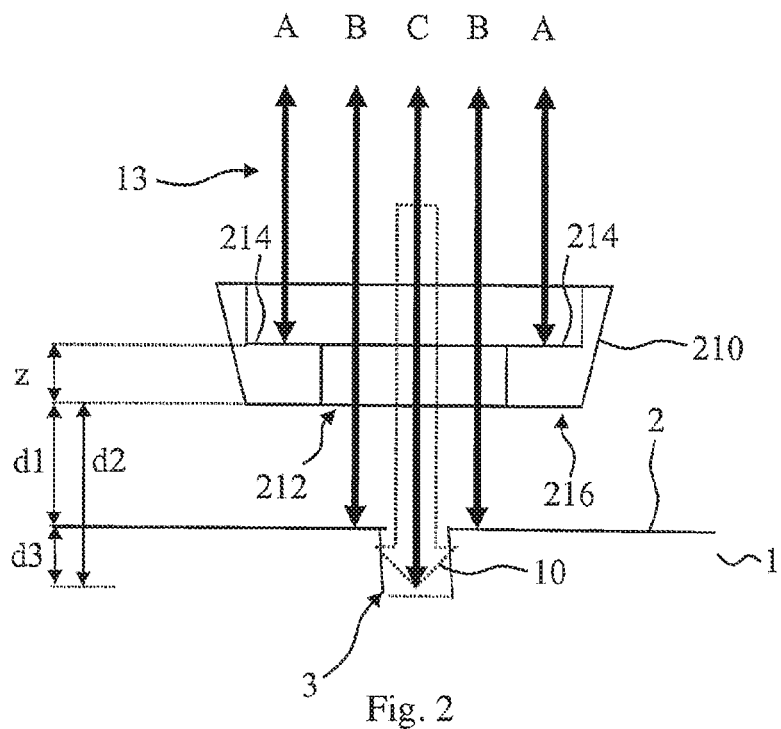
FIG. 2 shows a portion of a machining head according to embodiments of the present disclosure.

FIG. 2 shows a portion of the machining head of the laser machining system according to embodiments of the present disclosure.

The machining head comprises a housing 210 having an opening 212 for emitting the laser beam 10 from the machining head. The opening 212 may be, for example, the opening of a cutting nozzle. During operation of the laser machining system, the laser beam 10 exits the opening 212 through the opening 212 and hits the workpiece 1. At least one reflective reference 214 is formed on an inner side of the housing 210. This reflective reference 214 may be, for example, an edge, a radius, a surface, a notch, a groove, or the like configured to reflect a part of the measurement beam 13. The machining head 101 further comprises a measuring device (e.g., the coherence tomograph 120 shown in FIG. 1) configured to direct the optical measurement beam 13 to the opening 212 and the at least one reflective reference 214. A portion A of the optical measurement beam 13 is consequently reflected at the reflective reference 214, another portion B of the optical measurement beam 13 exits from the machining head 101 through the opening 212 and is reflected at the workpiece surface 2. The reflected beams are superposed with the light from the reference arm 136 and guided back to the measurement unit or evaluation unit 130 in order to determine the distance to the reflective reference 214 and the distance to the workpiece surface 2 and therefrom the distance (d1+z) between the reflective reference 214 and the workpiece surface 2. However, the reference arm 136 is optional. It is also possible to superpose only the reflected beams or partial beams A and B in order to determine the distance (d1+z) between the reflective reference 214 and the workpiece surface 2.

Taking into account an offset, i.e., the distance between the reflective reference 214 to the end portion 216 of the laser machining head 101 or to the nozzle lower edge, therefore the distance d1 between the workpiece surface 2 and the laser machining head 101 can be determined. The offset z (also referred to as a "predetermined distance") may be defined between a point or region of the reflective reference 214 that forms the origin of the first reflection A and the end portion 216, such as the end of the machining head which includes an opening 212 or is opposite the workpiece 1. The offset z may be a substantially fixed distance determined or predetermined by the structural design of, for example, the nozzle, which may be integrally formed. However, the reflective reference 214 may be located in the opening 212 just above the end portion 216 so that the offset is very small and thus negligible.

The measuring device or the evaluation unit 130 is therefore configured to determine a distance d1 between the end portion 216 and the workpiece 1 based at least on (i) a first reflection A of the optical measurement beam 130 from the reflective reference 214 and (ii) a second reflection B of the optical measurement beam 13 from the workpiece 1. In addition (if necessary), the offset z between the reflective reference 214 and the end portion 216 of the machining head can be taken into account. This allows a precise and error-free measurement of the distance to the workpiece 1 to be performed. In addition, during the machining process, the distance d1 between the machining head and the workpiece 1 can be kept constant and collisions between the machining head and the workpiece 1 can be prevented.

The optical path of the measurement beam depends, inter alia, from the refractive index of the medium through which the measurement beam passes. For example, the machining head may include a region filled with cutting gas, for example between a protective glass of the machining head and the nozzle. Since the pressure and temperature of the cutting gas may vary greatly depending on the process control, the optical path length for the measurement beam changes depending on the process. The resulting optical path length change may therefore be compensated for by directing the measurement beam and the reflection or reference beam through the same gas-filled volume.

The measurement beam 13 may comprise a plurality of separate partial beams which hit different areas, i.e., on the reflective reference 214 in the machining head and on the workpiece surface 2, or a single beam so large in the diameter that one part hits the reflective reference 214 and another part hits the workpiece surface 2. In addition, the measurement beam 13 may comprise a partial beam or part which hits the machining point or the kerf. The measuring device or the evaluation unit 130 may determine a machining depth d3, i.e., the distance of a reflective machining ground to the workpiece surface 2, and/or a distance d2 between the machining ground and the machining head 101 or end portion 216 of the machining head 101. Here too, the offset z between the at least one reflective reference 214 and the end section 216 of the machining head may optionally be taken into account.

In the example shown in FIG. 2, different measurement beams are incident on different surfaces including at least the reflective reference 214 and the workpiece surface. In particular, the optical measurement beam 13 includes two or more partial beams here, wherein at least a first partial beam of the two or more partial beams is directed to the at least one reflective reference 214 and at least a second partial beam of the two or more partial beams is directed to the opening 212. In order to divide the measurement beam 13 into different partial beams, optical elements, e.g., an optical wedge in the collimated beam, a beam splitter, an electro-optic modulator (EOM), an acousto-optic modulator (AOM), a deflection unit or a scanner, may be used.

For example, the at least one first partial beam may generate the first reflection A, and the at least one second partial beam may generate the second reflection B. Several second partial beams are directed independently of each other to different regions of the workpiece 1. The second reflection may include, for example, a reflection B from the workpiece surface 2.

Figure 3:
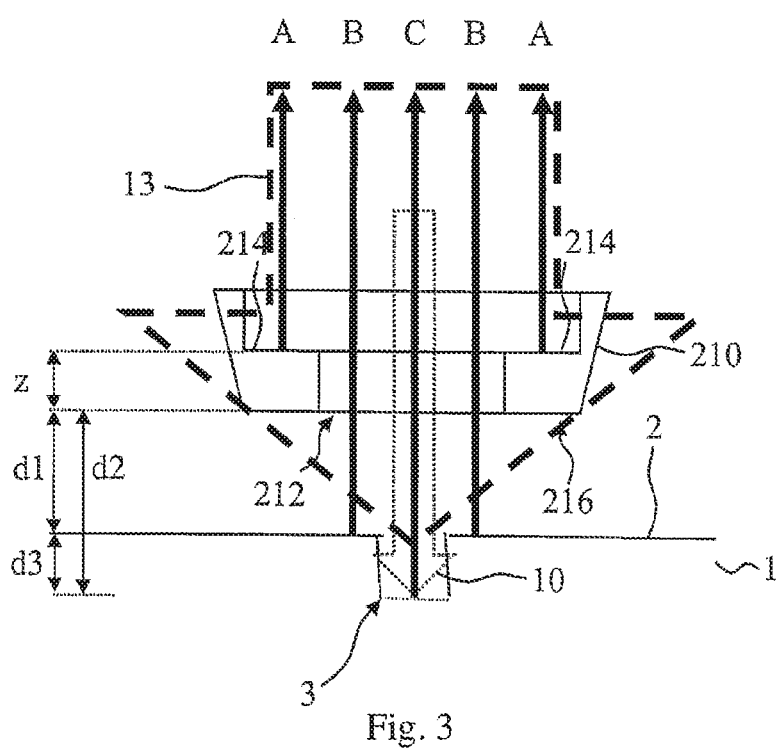
FIG. 3 shows a portion of a machining head according to further embodiments of the present disclosure.

FIG. 3 shows a portion of the machining head of the laser machining system according to further embodiments of the present disclosure. The aspects described with reference to FIG. 2 may be used analogously in the embodiment shown in FIG. 3. Therefore, only the differences are explained below.

In the example shown in FIG. 3, a single measurement beam is so large in diameter that it hits the reflective reference 214, the workpiece surface 2, and the kerf 3. For example, the optical measurement beam 13 is a single measurement beam having a diameter larger than a diameter of the opening 212 of the housing 210 or the nozzle.

Typically, the measuring device is configured to calculate the distance d1 between the end portion 216 and the workpiece 1 based on a difference between a distance determined from the second reflection B and a distance determined from the first reflection A, while taking into account the offset z. The distances from the first reflection A and the second reflection B may be determined with respect to a reference of the measuring device. For example, the distances from the first reflection A and the second reflection B may indicate respective path lengths or path length differences of the reflections with respect to the reference of the measuring device. As explained above, however, a reference of the measuring device, such as the reflected light in the reference arm 136, is not necessarily required, but it is also possible to determine the path length difference and thus the distance (d1+z) only from the first reflection A and the second reflection B. In an exemplary embodiment, the distance d1 between the end portion 216 and the workpiece surface 2 may be calculated by subtracting the distance from the first reflection A (and optionally the offset z) from the distance from the reflection B. Similarly, the distance d2 between the end portion 216 and the machining ground may be calculated by subtracting the distance from the first reflection A (optionally corrected by the offset z) from the distance from the reflection C. The distance d3 between the surface 2 of the workpiece 1 and the machining ground may be calculated, for example, by subtracting the distance from the reflection B from the distance from the reflection C.

The end portion 216 may be an extreme end of the machining head directly opposite the workpiece 1. The distance d1 between the end portion 216 of the machining head and the surface 2 of the workpiece 1 may be defined such that the machining head, e.g., the cutting nozzle, contacts the surface 2 of the workpiece 1 when the distance d1 between the end portion 216 and the surface 2 of the workpiece 1 is approximately zero, and does not contact the surface 2 of the workpiece 1 (i.e., a gap with the width d1 is present) when the distance d1 is greater than zero.

In some embodiments, the at least one reflective reference 214 includes (or is) a reflective surface and/or a reflective edge and/or a reflective radius. In particular, the reflective reference 214 may be oriented such that the measurement beam 13 incident on the at least one reflective reference 214 is reflected back into itself. Preferably, the reflective reference 214 is located in the vicinity of the opening 212 so that the offset z may be negligible.

Typically, the at least one reflective reference 214 is arranged on the inner surface of the machining head 101 or the housing 210 or provided by the inner surface of the machining head 101 or the housing 210. For example, the inner surface of the housing 210 may be configured to reflect the measurement beam 13. In some embodiments, the machining head further includes a nozzle, in particular a cutting nozzle, comprising the housing 210 and the at least one reflective reference 214. For example, the reflective reference 214 is formed on the inner surface of the nozzle containing the opening 212. The nozzle may be detachably mounted on the machining head 101.

Figure 4:
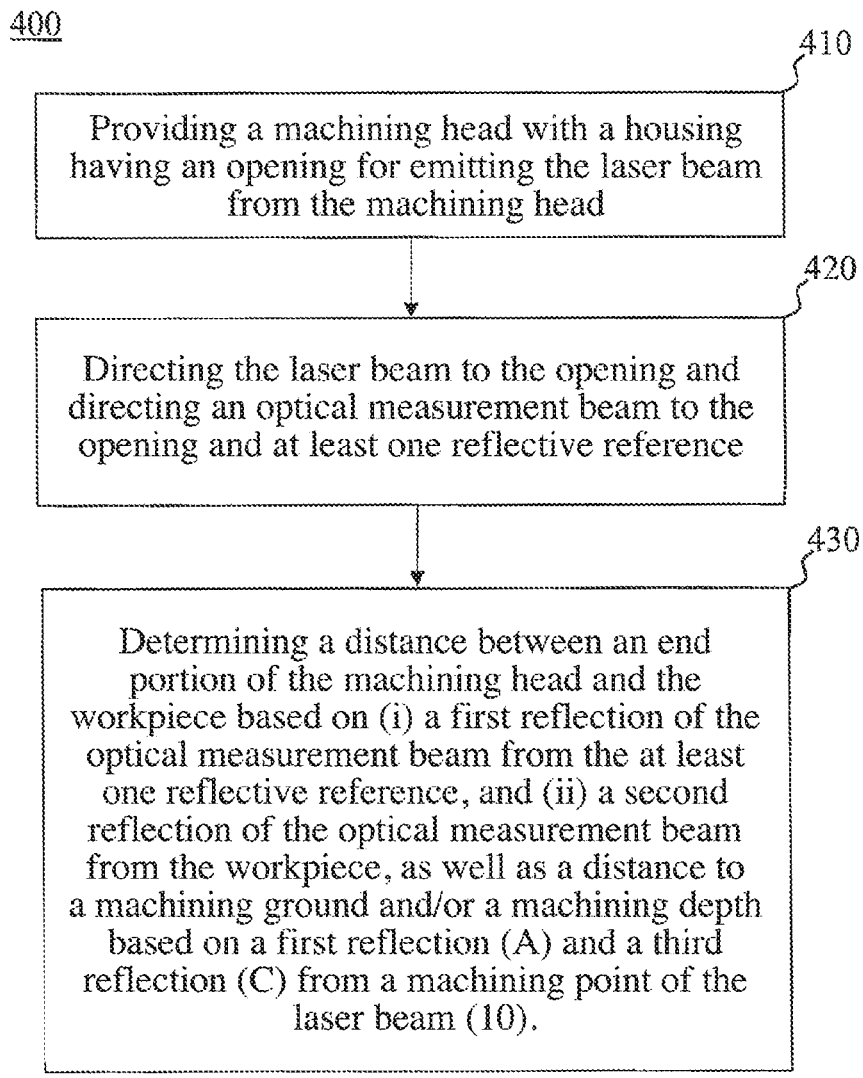
FIG. 4 shows a flowchart of a method for machining a workpiece using a laser beam.

FIG. 4 shows a flowchart of a method 400 for machining a workpiece using a laser beam. The method 400 may be implemented by the machining head or laser machining system of the present disclosure. In addition, the machining head may be configured to carry out the method 400 according to the present disclosure.

The method 400 comprises, at block 410, providing a machining head 101 with a housing 210 having opening 212 for emitting the laser beam from the machining head 101. At block 420, the laser beam 10 is directed through the opening 212 onto the workpiece surface 2. In addition, a measurement beam 13 is directed through the opening 212 onto the workpiece surface 2 as well as onto at least one reflective reference 214 at the housing 210. Preferably, the laser beam 10 and the measurement beam 13 are concurrently directed to the respective surfaces. The method further comprises, at block 430, determining a distance between an end portion 216 of the machining head 101 and the workpiece surface 2 based on (i) a first reflection A of the optical measurement beam 13 from the reflective reference 214 and (ii) at least one second reflection B of the optical measurement beam from the workpiece surface 2. Optionally, the offset z between the reflective reference 214 and the end portion 216 may be taken into account.

According to the invention, in the machining head, for example in a nozzle of a cutting head, there is a reference surface, edge or radius at which one of a plurality of optical measurement beams or a part of an optical measurement beam is reflected back into the signal evaluation unit. Another of the plurality of optical measurement beams or another part of the optical measurement beam hits the workpiece surface and is also reflected back into the signal evaluation unit therefrom. At least two measuring signals result, from the difference of which the distances between the nozzle and the workpiece surface, the workpiece surface and the machining surface (i.e., the machining depth) and/or the nozzle and the machining ground may be calculated.

This allows for a precise and error-free measurement of the distance to the workpiece. By taking into account a beam reflected from the workpiece surface and a beam reflected from a reference near the exit opening of the machining head, changes in the optical path length, e.g. due to refractive index changes due to pressure fluctuations within the machining head or heating of optical elements, can be compensated. A parallel orientation of the laser beam and the measurement beam and/or an orientation of the measurement beam perpendicular to the workpiece surface may further increase the accuracy of the distance measurement, in particular for large distances between workpiece surface and machining head. In addition, when cutting with laser radiation, the distance between the machining head, in particular the nozzle or cutting nozzle, can be kept constant relative to the surface of the workpiece. Due to the constant distance during the cutting, the machining process is more stable.

The invention claimed is:

1. A method for machining a workpiece using a laser beam, comprising:
   providing a machining head with a housing having an opening for emitting said laser beam from said machining head and at least one reflective reference for reflecting an optical measurement beam, the at least one reflective reference being provided on an inner surface of the housing;

directing the optical measurement beam partially through said opening onto said workpiece and partially onto said reflective reference, said optical measurement beam being at least partially parallel to said laser beam;

determining a distance (d1) between said machining head and said workpiece based on a first reflection (A) of said optical measurement beam from said at least one reflective reference and on a second reflection (B) of said optical measurement beam from said workpiece; and determining a distance (d2) to a machining ground by subtracting a distance of said first reflection (A) from a distance of a third reflection (C) from a machining point of said laser beam, wherein said optical measurement beam is a single measurement beam having a circular diameter greater than a diameter of said opening of said housing and extending continuously over its entire cross-section in order to simultaneously obtain the first, second, and third reflection (A, B, C).

2. The method according to claim 1, wherein the step of determining the distance (d1) comprises determining said distance (d1) between an end portion of said machining head and said workpiece while taking into account a known offset (z) between said reflective reference and said end portion of said machining head including said opening.

3. The method according to claim 1, wherein said reflective reference is adjacent to said opening.

4. The method according to claim 1, wherein said optical measurement beam is coaxial with said laser beam through said opening.

5. The method according to claim 1, wherein said housing comprises a nozzle including said opening and said reflective reference.

6. The method according to claim 1, wherein the step of determining the distance (d1) comprises determining the distance (d1) using an optical coherence tomograph.

7. A method for machining a workpiece using a laser beam, comprising:

providing a machining head with a housing having an opening for emitting said laser beam from said machining head and at least one reflective reference for reflecting an optical measurement beam;

directing the optical measurement beam partially through said opening onto said workpiece and partially onto said reflective reference, said optical measurement beam being at least partially parallel to said laser beam; and determining a distance (d1) between said machining head and said workpiece based on a first reflection (A) of said optical measurement beam from said at least one reflective reference and on a second reflection (B) of said optical measurement beam from said workpiece, and determining a distance (d2) to a machining ground by subtracting a distance of said first reflection (A) from a distance of a third reflection (C) from a machining point of said laser beam, wherein the at least one reflective reference is oriented such that the first reflection of said optical measurement beam and the optical measurement beam are coaxial, wherein said optical measurement beam is a single measurement beam having a circular diameter greater than a diameter of said opening of said housing and extending continuously over its entire cross-section in order to simultaneously obtain the first, second, and third reflection (A, B, C).

8. A method for machining a workpiece using a laser beam, comprising:

providing a machining head with a housing having an opening for emitting said laser beam from said machining head and at least one reflective reference for reflecting an optical measurement beam, wherein the at least one reflective reference is located in a circumferential area of the opening;

directing the optical measurement beam partially through said opening onto said workpiece and partially onto said reflective reference, said optical measurement beam being at least partially parallel to said laser beam; and determining a distance (d1) between said machining head and said workpiece based on a first reflection (A) of said optical measurement beam from said at least one reflective reference and on a second reflection (B) of said optical measurement beam from said workpiece, and determining a distance (d2) to a machining ground by subtracting a distance of said first reflection (A) from a distance of a third reflection (C) from a machining point of said laser beam, wherein said optical measurement beam is a single measurement beam having a circular diameter greater than a diameter of said opening of said housing and extending continuously over its entire cross-section in order to simultaneously obtain the first, second, and third reflection (A, B, C).

9. The method according to claim 1, wherein the step of determining the distance (d1) comprises determining the distance (d1) by subtracting a distance of said first reflection (A) from a distance of said second reflection (B).

10. The method according to claim 7, wherein the step of determining the distance (d1) comprises determining the distance (d1) by subtracting the distance of said first reflection (A) from the distance of said second reflection (B).

11. The method according to claim 8, wherein the step of determining the distance (d1) between said machining head and said workpiece comprises determining the distance (d1) by subtracting the distance of said first reflection (A) from the distance of said second reflection (B).

* * * * *